Feb. 19, 1957 R. E. SEELY 2,782,353
THREE PHASE DYNAMOELECTRIC MACHINE
Filed Dec. 29, 1954
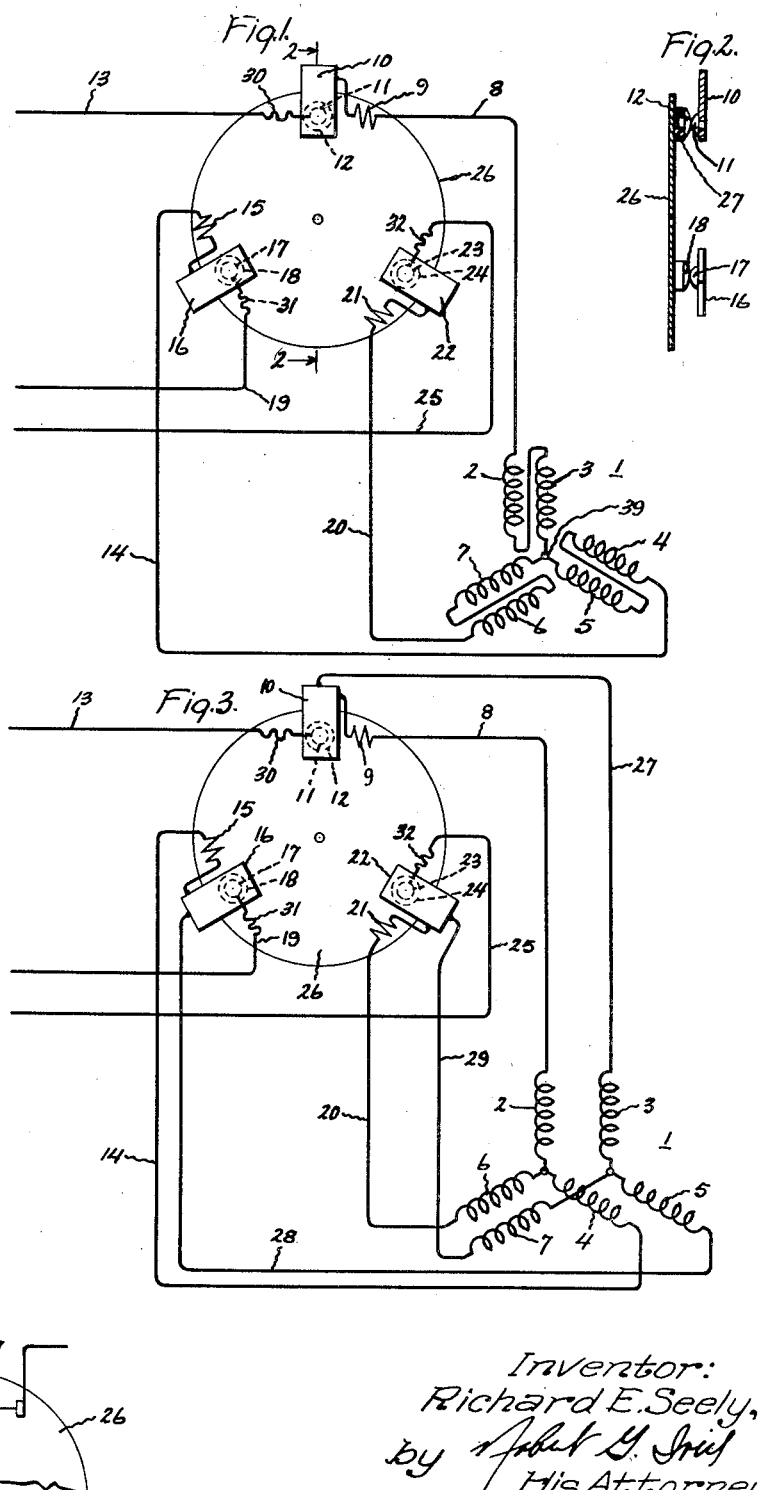
Inventor:
Richard E. Seely,
by [signature]
His Attorney.

United States Patent Office 2,782,353
Patented Feb. 19, 1957

2,782,353

THREE PHASE DYNAMOELECTRIC MACHINE

Richard E. Seely, Fort Wayne, Ind., assignor to General Electric Company, a corporation of New York Application December 29, 1954, Serial No. 478,397

5 Claims. (Cl. 318—225)

This invention relates to dynamoelectric machinery, and more particularly to three phase alternating current dynamoelectric machines having thermal protective circuits.

Numerous thermal overload devices have been developed, and equally numerous circuits for utilizing such devices have been used, for the thermal protection of single phase alternating current motors. In the case of three phase alternating current motors, however, it is desirable to provide thermal protection for each phase of the motor winding independently of the other phases. However, it is also, of course, desirable that, in response to undue heating in any phase of the motor, all windings be caused to open. Protection of this nature is afforded for particular types of three phase alternating current motors by the apparatus set forth and claimed in Patent No. 2,62,-203, issued to the present inventor and assigned to the assignee of the present application. The apparatus of that patent affords the needed protection in Y-connected three phase alternating current apparatus, particularly where a rapid response is desirable because of the characteristics of the machine. It will be seen, however, that it is highly desirable to provide protection for motors which will be equally effective in delta-connected and in Y-connected apparatus. Another desirable feature is the location of the protective apparatus in a position where it is not necessary to bring Y connection out of the motor, that is, it is desirable that the protective apparatus be usable in locations other than right at the Y. In most conventional three phase dynamoelectric machines, the locked rotor current densities in the rotor and stator windings of the machine are low enough so that the very rapid response of the apparatus set forth in the above mentioned patent may not be necessary. It is in connection with such motors that it is proposed to provide apparatus incorporating the desirable features set forth above. In addition, it is desirable to provide such features in connection with motors whose windings may be connected for either high or low voltage operation.

It is, therefore, an object of this invention to provide an improved three phase alternating current machine having thermal protective apparatus which will incorporate the desirable features set forth above.

Further objects of this invention will become apparent and this invention will be better understood by reference to the following description and the accompanying drawing, and the features of novelty which characterize this invention will be pointed out with particularity in the claims annexed to and forming a part of this specification.

This invention, in its broadest aspect, provides a three phase alternating current dynamoelectric machine having three windings respectively adapted to be connected to the three lines of a three phase source of alternating current. A protective device for this machine has three heating elements which are respectively adapted to be connected in series with the lines. Means movable in response to heat, such as a bimetallic element, are arranged in physical proximity to the heating elements; three stationary contacts are respectively connected to the three lines to the windings and three movable contacts are respectively engageable with the stationary contacts and are secured to but electrically insulated from the movable means. The movable contacts are arranged to be in engagement with the stationary contacts respectively until the movable means respond to heat to disengage the contacts thereby to open the circuits to the windings.

In the drawing,

Figure 1 is a schematic illustration of a three phase motor embodying the improvements of this invention;

Figure 2 is a view along line 2—2 of Figure 1;

Figure 3 is a schematic illustration of a three phase motor embodying the improved thermal protection of this invention when the motor is connected for low voltage operation; and Figure 4 is a fragmentary view, partly schematic, of a modified contact arrangement for use in the improved thermal protective apparatus of this invention.

Referring now to Figure 1 of the drawing, there is shown schematically the field member 1 of a polyphase dynamoelectric machine having six winding sections 2, 3, 4, 5, 6, and 7. When the motor is to be operated at a predetermined relatively high voltage, such as, for instance, 440 volts, sections 2 and 3, 4 and 5, and 6 and 7 are respectively connected in series. The three groups of winding sections are then connected in a Y at point 39. A line 8 serially connects windings 2 and 3 to a heating element 9 which is in turn connected to a conductive member 10 which supports a contact member 11. Contact member 11 in turn is arranged to engage another contact member 12 which is connected to a line 13 of a three phase source of alternating current power. Exactly the same elements are provided in the same order for the other two groups of winding sections as shown by numerals 14 through 19 for sections 4 and 5 and by numerals 20 through 25 for winding sections 6 and 7.

Contacts 12, 18, and 24 are respectively secured to a heat responsive member 26 which may be, as shown, a bimetallic disc element. As shown in connection with contact 12 in Figure 2, contacts 12, 18, and 24 are electrically insulated from member 26 by part 27. The bimetallic member 26 is arranged to buckle at a predetermined temperature and thereby cause contacts 11, 17, and 23 to separate respectively from contacts 12, 18, and 24. This will open all three lines of the three phase motor and all the winding sections will be deenergized. It will be observed that the bimetallic element forms no part of any circuit because of the presence of insulation parts 27 between the contacts 12, 18, and 24 on the one hand and the bimetallic element on the other. Thus, when the different groups of contacts are respectively in engagement, each set of winding sections 2 and 3, 4 and 5, and 6 and 7 will be connected to lines 13, 19, and 25 respectively. In response to a current overload in any one phase, the heating element in series with the pair of winding sections making up that phase will heat up and this heat will be transmitted to the bimetallic element which will then buckle to open all the sets of contacts to de-energize all the phases. By utilizing a single bimetallic element insulated from the electrical apparatus, there is provided an economical structure which may be positioned anywhere in contradistinction to the previous requirement that the protective apparatus be positioned at the Y.

Referring now to Figure 3, operation of the same motor when connected for low voltage operation, such as 220 volts, for instance, will be explained. When the motor 1 is connected for low voltage operation, winding sections 2, 4, and 6 are connected into a Y at point 40, and winding sections 3, 5, and 7 are connected into a separate Y at point 41 in parallel with the first Y. As before, section 2 is connected through line 8 to heating element 9, conductive member 10, contacts 11 and 12, and line 13. Winding section 3, however, is connected in parallel with winding section 2 through a line 27 which joins it to conductive member 10. It will be observed that because of this connection, the current through winding section 3 will not affect the heating element 9. Winding section 4 is connected in the same manner as in Figure 1 and winding section 5 is connected in parallel therewith through line 28 so that the current through winding section 5 will not affect heating element 15. Winding section 7 is connected to conductive element 22 by a line 29 in the same manner so that the current through winding section 7 will not affect the heating element 21. Winding section 6 is connected as in Figure 1. It will be seen from Figure 3 that, provided the two sections of a single phase are substantially the same, the current through that phase will be substantially equally divided between the two sections and, for this reason, the heating element in any one phase will receive only approximately half the current in that phase. Where the voltage across each phase is approximately half that of the connection of Figure 1, it follows that the current through each phase will be substantially twice that for the connections of Figure 1. However, since only half the current traverses the heating element, it will be apparent that the heating elements will cause the bimetallic element 26 to snap the three sets of contacts open under the same conditions as would cause that effect in Figure 1. Thus, the provisions of this invention permit use of thermal protective apparatus in such a manner that proper and equal protection will be afforded the windings of a machine even if it be for two voltage operation, and that this protection will be present at both voltages.

Referring now to Figure 4 of the drawing, there is shown a modified contact arrangement which eliminates the necessity for the pigtails 30, 31, and 32 provided in connection with the circuits of Figures 1 and 3. A small piece of insulation 33 may be secured to the bimetallic element 26, and a contact structure 34 in the shape of a rivet will be secured within the piece 33 by its shape alone. The rivet shaped bridging contact member 34 will be provided with contacts 35 and 36 which will be adapted respectively to engage stationary contacts 37 and 38. It will be seen that by the use of a bridging contact member 34 and two stationary contacts 37 and 38, the pigtail connection to the movable contact member secured to bimetallic member 26 may be avoided, if so desired. It will also be clear from the description of this embodiment that a variety of contact arrangements may be possible without departing from the scope of this invention. Furthermore, it will be understood that while the invention has been specifically described in connection with a dual voltage Y-connected motor, it will be equally desirable in connection with a single voltage Y-connected motor and that its use will be equally great with other types of three phase connections, such as delta-connected motors. It will be clear to those skilled in the art that the connections of the invention will not be changed in any way for a different winding arrangement except insofar as the winding connections themselves are modified.

Thus, while the invention has been explained by describing particular embodiments thereof, it will be apparent that improvements and modifications may be made without departing from the scope of the invention as defined in the appended claims.

What I claim as new and desire to secure by Letters Patent of the United States is:

1. A three phase alternating current dynamoelectric machine comprising three phase windings, three lines respectively arranged to connect said windings to a three phase source of alternating current power; and protective means comprising three heating elements respectively connected in series with said lines between said windings and said lines, means movable in response to heat arranged in physical proximity to said heating elements, three stationary contact means respectively connected in the lines to said windings, and three movable contact means respectively engageable with said stationary contact means secured to and electrically insulated from said movable means, said movable contact means being arranged to be in engagement with said stationary contact means respectively until said movable means respond to heat to disengage said movable contact means from said stationary contact means respectively to open the connections to said windings.

2. A three phase alternating current dynamoelectric machine comprising three phase windings, three lines respectively arranged to connect said windings to a three phase source of alternating current power; and protective means comprising three heating elements respectively connected in series with said lines between said windings and said lines, a bimetallic element movable in response to heat arranged in physical proximity to said heating elements, three stationary contacts respectively connected in the lines to said windings, and three movable contacts respectively engageable with said stationary contacts secured to and electrically insulated from said bimetallic element, said movable contacts being arranged to be in engagement with said stationary contacts respectively until said bimetallic element responds to heat to disengage said movable contacts from said stationary contacts respectively to open the connections to said windings.

3. A three phase alternating current dynamoelectric machine comprising three phase windings respectively adapted to be connected to the three lines of a three phase source of alternating current power; and protective means comprising three heating elements respectively adapted to be connected in series with said lines, a bimetallic element movable in response to heat arranged in physical proximity to said heating element, three pairs of spaced stationary contacts respectively connected in the lines to said windings, and three movable bridging contacts respectively engageable with said pairs of stationary contacts secured to and electrically insulated from said bimetallic member, said movable contacts being arranged to be in engagement with said pairs of stationary contacts respectively until said bimetallic member responds to heat to disengage said movable contacts from said pairs of stationary contacts respectively to open the connections to said windings.

4. A dual-voltage three phase alternating current dynamoelectric machine comprising three phase windings respectively adapted to be connected to three lines of a three phase source of alternating current power, each of said phase windings comprising a pair of winding sections, means for connecting the sections in each pair in series so as to form a Y connection for operation at a first voltage, and in parallel so as to form a pair of parallel Y connections for operation at a second voltage; and a protective device comprising three heating elements respectively adapted to be connected in said lines, means for connecting said elements in series with said Y connection when said motor is connected for operation at said first voltage and in series with one of said Y connections and in parallel with the other of said Y connections when said motor is connected for operation at the second of said voltages, means movable in response to the heat arranged in physical proximity to said heating elements, three stationary contact means respectively connected in series with said phase windings, and three movable contacts respectively engageable with said stationary contact means secured to and electrically insulated from said movable means, said movable contact means being arranged to be in engagement with said stationary contact means respectively until said movable means responds to heat to disengage said movable contact means from said stationary contact means respectively to open the connections to said windings.

5. A dual-voltage three phase alternating current dynamoelectric machine comprising three phase windings respectively adapted to be connected to three lines of a three phase source of alternating current power, each of said phase windings comprising a pair of winding sections, means for connecting the sections in each pair in series so as to form a Y connection for operation at a first voltage, and in parallel so as to form a pair of parallel Y connections for operation at a second voltage; and a protective device comprising three heating elements respectively adapted to be connected in said lines, and means for connecting said elements in series with said Y connection when said motor is connected for operation at said first voltage and in series with one of said Y connections and in parallel with the other of said Y connections when said motor is connected for operation at the second of said voltages, a bimetallic element arranged in physical proximity to said heating elements, three stationary contacts respectively connected in series with said phase windings, and three movable contacts respectively engageable with said stationary contacts secured to and electrically insulated from said bimetallic element, said movable contacts being arranged to be in engagement with said stationary contacts respectively until said bimetallic element responds to heat to disengage said movable contacts from said stationary contacts respectively to open the connections to said windings.

References Cited in the file of this patent
UNITED STATES PATENTS

| | | |
|---|---|---|
| 2,662,203 | Seely | Dec. 8, 1953 |
| 2,707,763 | Kurtz | May 3, 1955 |